United States Patent [19]

Winkler et al.

[11] Patent Number: 4,863,319
[45] Date of Patent: Sep. 5, 1989

[54] MACHINE TOOL

[75] Inventors: Hans-Henning Winkler, Tuttlingen; Eugen Rütschle, Mühlheim; Rudolf Haninger, Seitingen, all of Fed. Rep. of Germany

[73] Assignee: Chiron-Werke GmbH & Co. KG, Fed. Rep. of Germany

[21] Appl. No.: 237,769

[22] Filed: Aug. 29, 1988

Related U.S. Application Data

[63] Continuation-in-part of Ser. No. 906,323, Sep. 11, 1986, Pat. No. 4,768,902.

[30] Foreign Application Priority Data

Sep. 17, 1985 [DE] Fed. Rep. of Germany ....... 3533089
Oct. 14, 1987 [DE] Fed. Rep. of Germany ....... 3734722
Feb. 25, 1988 [DE] Fed. Rep. of Germany ....... 3805842

[51] Int. Cl.⁴ ............................................ B23Q 11/08
[52] U.S. Cl. .............................. 409/134; 29/DIG. 56; 51/274; 74/608; 408/241 G
[58] Field of Search .............. 409/134, 137, 174, 224, 409/225; 51/235, 240 J, 240 A, 268, 272, 274; 29/DIG. 56; 408/241 G; 74/608, 609, 614; 83/860

[56] References Cited

U.S. PATENT DOCUMENTS

| 2,443,734 | 6/1948 | Kearney et al. | 409/134 |
| 3,366,012 | 1/1968 | Richter | 409/134 |
| 3,703,124 | 11/1972 | Smith et al. | 409/134 |
| 4,768,902 | 9/1988 | Rutschle et al. | 409/134 |

FOREIGN PATENT DOCUMENTS 654237 of 1981 Switzerland .
609181 3/1946 United Kingdom .
2080908 7/1981 United Kingdom .

Primary Examiner—Z. R. Bilinsky
Attorney, Agent, or Firm—Walter A. Hackler

[57] ABSTRACT

A machine tool comprises a spindle stock and a worktable having an upper surface thereon for mounting and machining workpieces. The worktable and the spindle stock are alternatively displaceable relative to each other in a plane parallel to the upper surface from a first position at which a first portion of the upper surface is disposed proximate the spindle stock and serves as a processing area and a second portion of said upper surface is disposed distal to said spindle stock and serves as a mounting area, to a second postion at which the upper surface second portion is disposed proximate the spindle stock and serves as a processing area and the upper surface first portion is disposed to the spindle stock and serves as a mounting area. A splash guard wall is provided for separating the processing in the mounting areas. The splash guard wall is attached to the table upper surface by means of a hinge defining a first pivot axis. Thus, the splash guard wall may be folded about the first pivot axis relative to the upper surface in order that a first working space above the processing area remains larger than a second working space above the mounting area when either the first or second portions of the upper surface is proximate to the spindle stock.

10 Claims, 10 Drawing Sheets

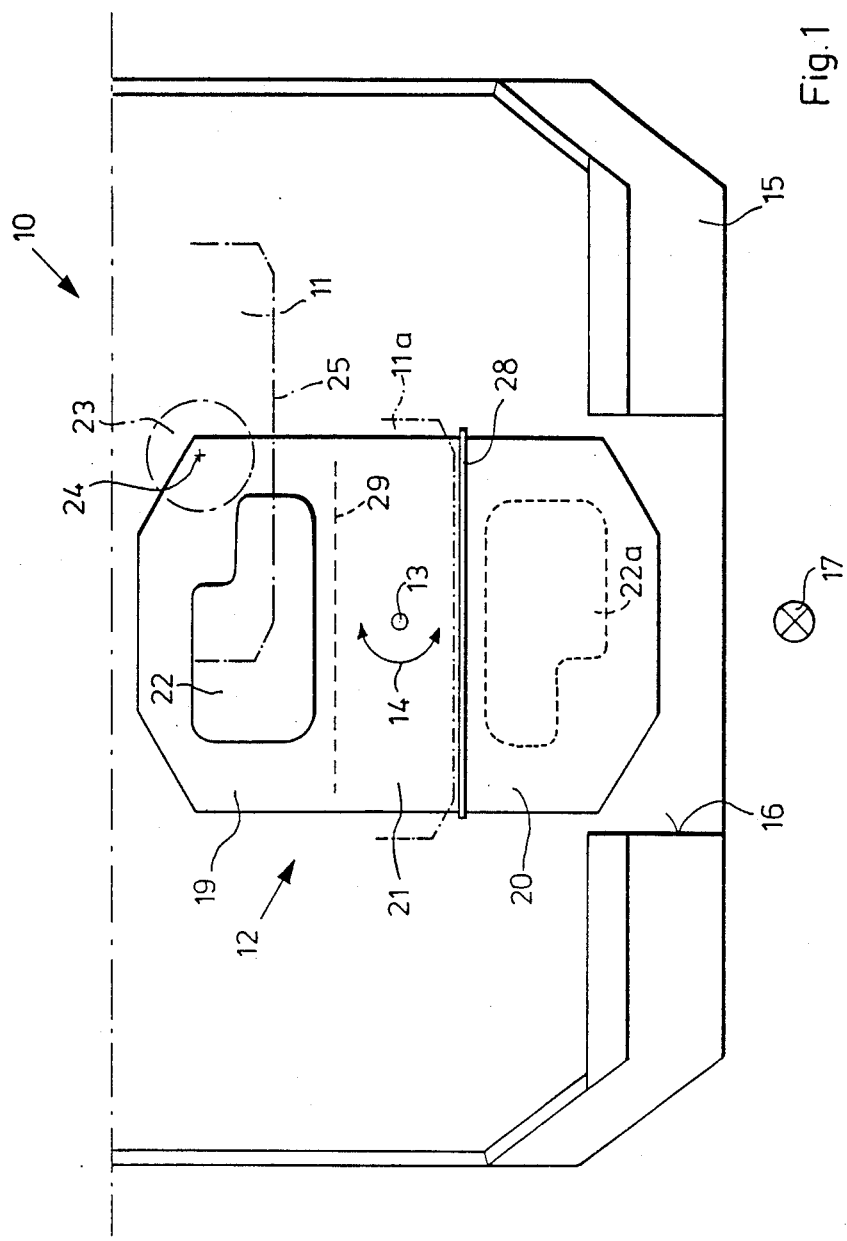

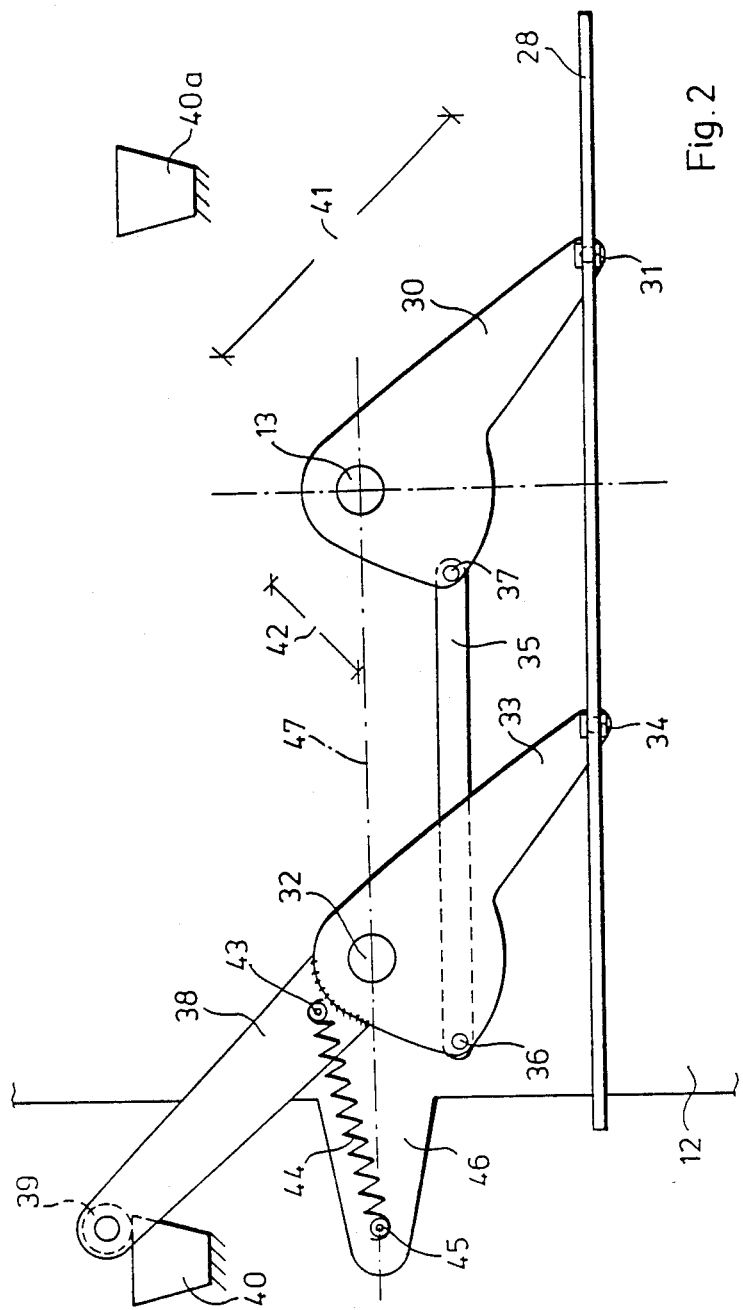

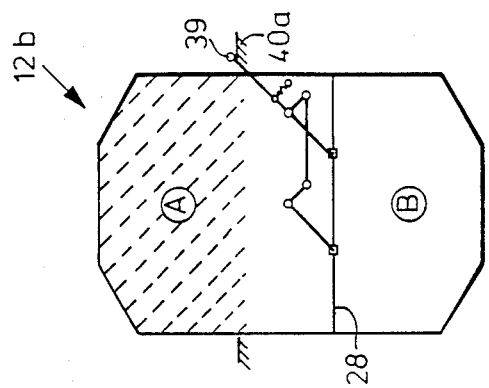
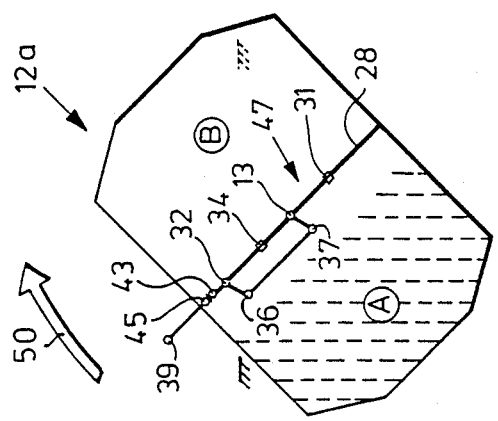
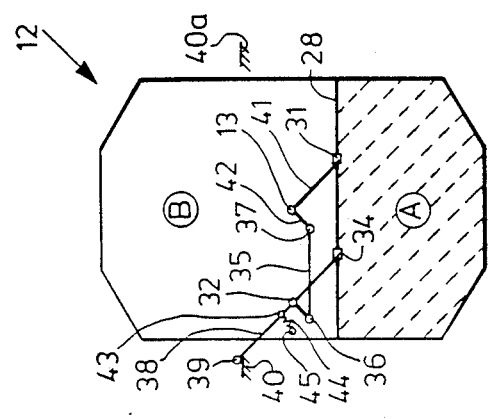

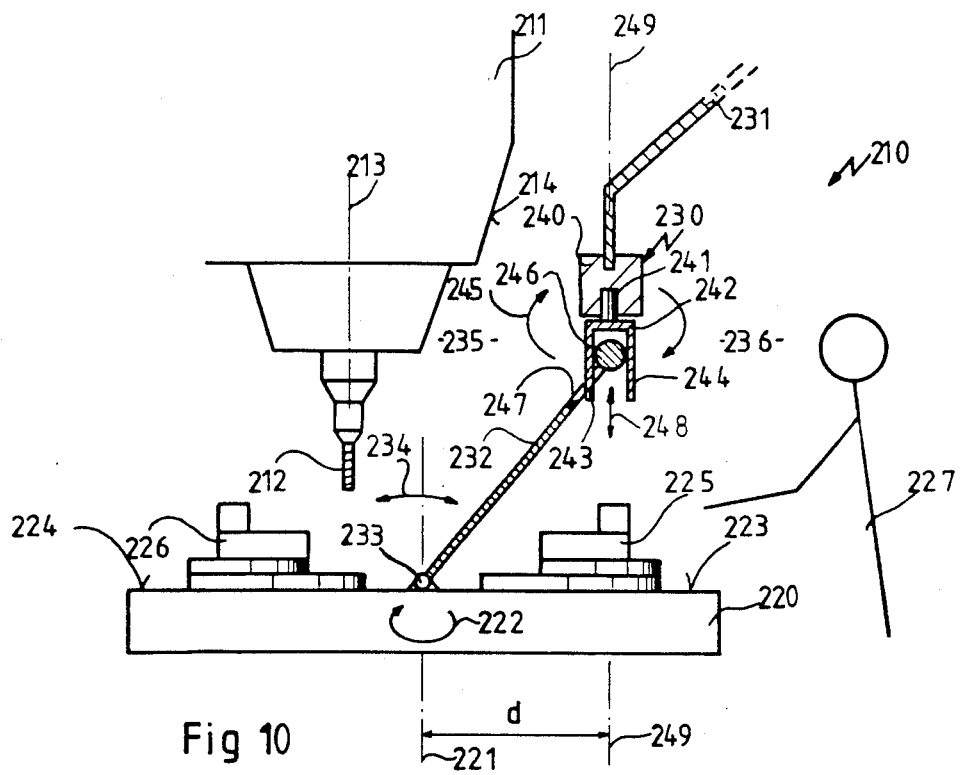
Fig 10
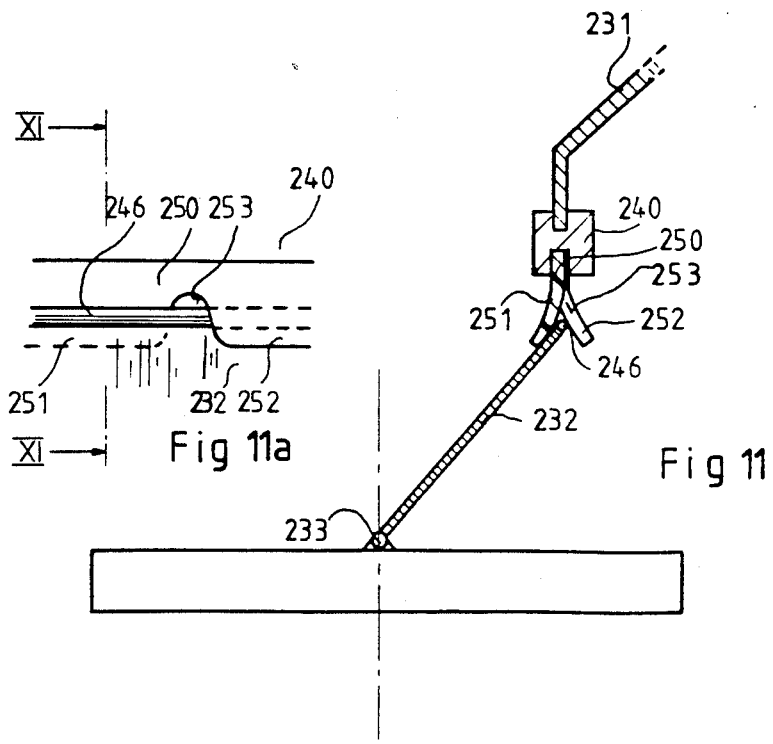
Fig 11a
Fig 11

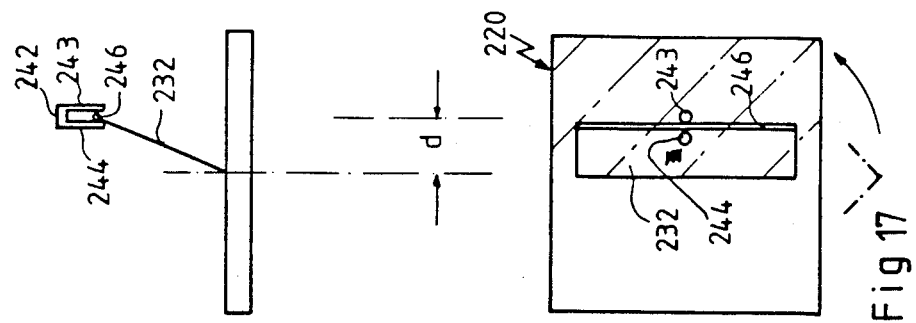
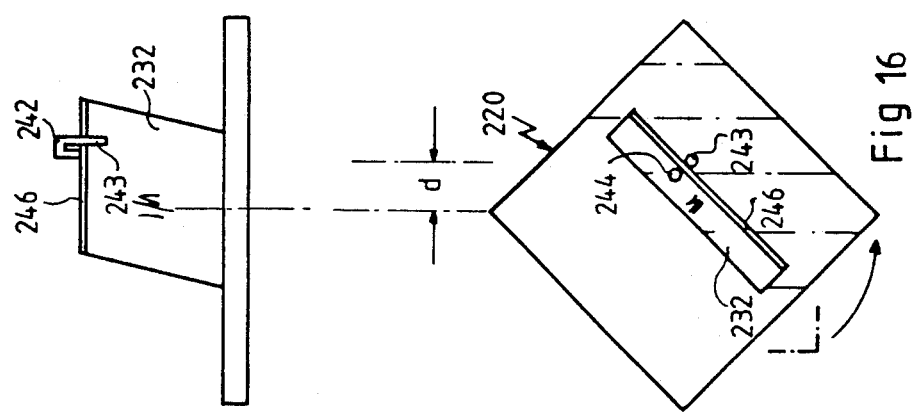
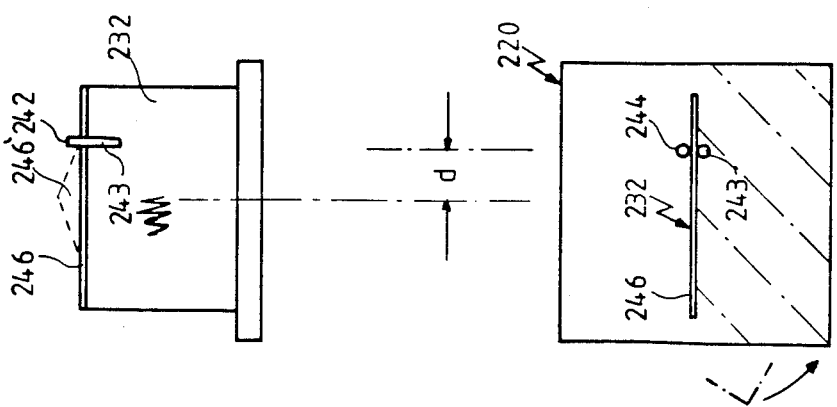
Fig 17
Fig 16
Fig 15

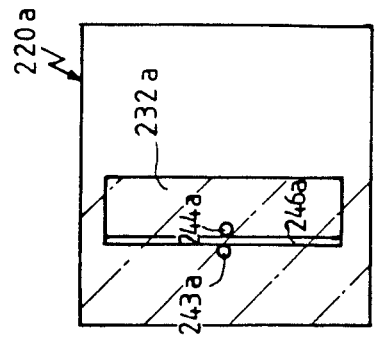
Fig 20
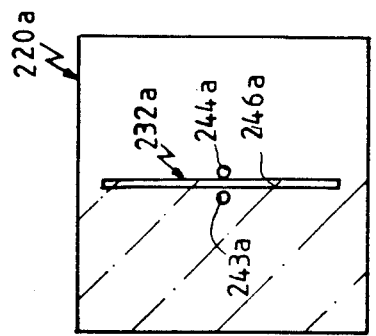
Fig 19
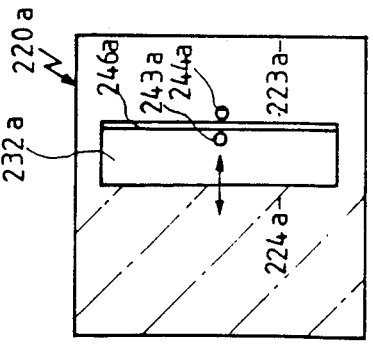
Fig 18
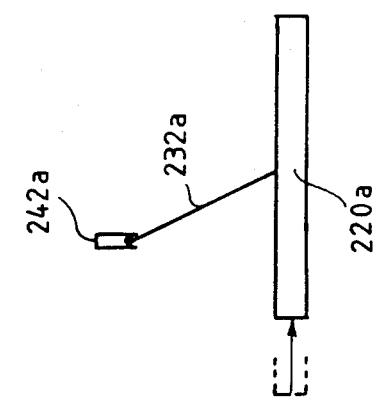
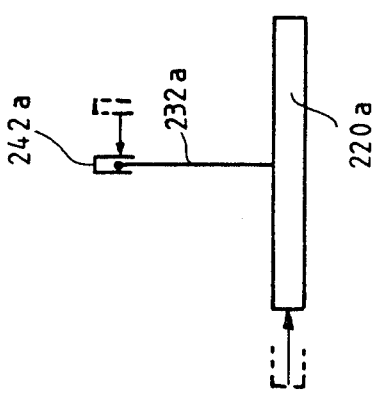
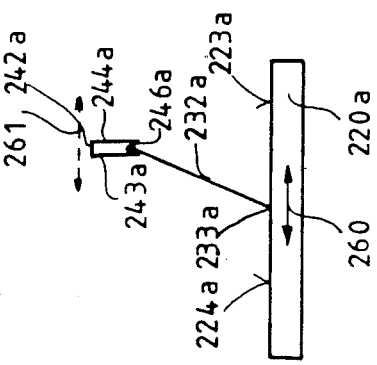

MACHINE TOOL

This application is a Continuation-In-Part application of U.S. patent application Ser. No. 906,323, Filed Sept. 11, 1986, now U.S. Pat. No. 4,768,902.

The present invention relates to a machine tool having a worktable comprising a first area which in a first position in which it serves as the processing side carries workpieces for being processed by means of a tool of the machine tool, and a second area which in a second position in which it serves as the mounting side can receive another workpiece, the two positions of the areas being exchangeable by relative displacement of the table and the spindle stock, and at least one splash guard which can be displaced relative to the worktable and which is arranged between the table areas.

One prior art machine tool is a so-called drilling and milling center with a vertical spindle stock about which a plurality of tools are arranged and where the tools can be loaded into or unloaded from a rotating spindle of the spindle stock one after the other by means of gripper arms to permit a predetermined sequence of operating processes to be carried out on the workpiece or workpieces mounted on the worktable. In this prior art machining center, the spindle stock can be displaced relative to the worktable along several axes. The worktable is designed as a rotary table, the rotary axis of which extends vertically and in parallel to the spindle axis and—viewed from the position of the operator of the machine—in front of the spindle axis.

In the following description, the areas of the worktable that can be displaced in the region of the spindle stock and/or of the user positioned opposite the spindle stock will be identified as "area", the respective position of these areas as "position", the space above the area as "working space", and the purpose the respective areas serve in the different positions as "processing side" or "mounting side", respectively.

The worktable of the known machine tool is subdivided into two areas. Every time the worktable is rotated by 180 degrees, one area serving as processing side is brought into a position near the spindle stock, while the other area serving as the mounting side is brought into a position near the user.

Now, the user can mount the next workpiece on the mounting side while the workpiece mounted on the processing side is being processed.

However, when processing workpieces, certain precautions have to be taken to prevent the operator of the machine tool from being soiled with splashing drilling coolant or even being injured by metal chips flying around. In the case of the prior art machine tool, therefore, the machine tool as such is fully enclosed by a cabin which is closed all around and provided on its top, in the reach of the user, with a hinged door suspended in such a manner that when the door is folded upwards, its lower edge follows a path rising over the outline of a workpiece to be mounted and falling again behind the said outline. In its open-position, the hinged door thus forms a splash wall between the processing side and the mounting side.

However, this known arrangement requires that the hinged door be suspended and guided on its upside so that the arrangement cannot be used in cases where the cover of the machine tool has to be open on its top because, for example, very heavy and/or bulky workpieces have to be placed on the worktable by means of a crane.

Another problem connected with machine tools of this type lies in the fact that although it is desirable that the whole surface of the mounting zone be used for mounting one or more workpieces, problems are encountered when the spindle stock, with the tool mounted therein, moves close to the edge of the processing area, because the casing of the spindle stock projects in this case into the opposite area on the mounting side. In this case, the splash guard would have to be arranged in the region of the mounting area to permit the tool mounted in the spindle axis to move up to the edge of the area on the processing side. When the table is then turned by 180 degrees, the arrangement would have to be exactly the other way, because now the two areas have been changed and the splash guard should be arranged on the surface of that area which previously served as the processing area. The known machine tool does not provide a solution to this problem.

Another prior art protective cover for a machine tool is arranged in a milling machine with a horizontal spindle axis. A worktable of circular shape—viewed from the top—is arranged beside the spindle and adapted to rotate centrically about a vertical axis. The surface of the worktable is subdivided into two semi-circular areas of equal size. Above the worktable, there is arranged a portal extending over the table along one diameter thereof—in a direction vertical to the spindle axis—and carrying three transparent flaps suspended thereon one beside the other on hinges similar to piano hinges. These flaps prevent on the one hand drilling coolant or the like from splashing around and serve, on the other hand, as a safety cover for the user of the machine. When the worktable is turned by 180 degrees in order to exchange the workpiece just processed against another one to be processed, the flaps hanging down from the portal are pushed open by the workpieces or the workpiece holder and return automatically to their position after passage of the workpieces. Thus, this known arrangement also provides the disadvantage that the working area of the worktable has the same size on the processing side and on the mounting side, and the same holds true for the working spaces thereabove.

Further, another prior art device has two worktables which are arranged closely adjacent each other and adapted to rotate about vertical axes extending in parallel to each other. The workholding fixtures provided on the worktable exhibit a rectangular shape, viewed from the top, and project over the edge of the table so that the path of movement of the tool carriers intersect when the worktables are rotated. Between the two worktables, there are provided two screens resting against the two workholding fixtures, respectively. The screens are arranged to pivot about a vertical axis extending symmetrically in front of the two worktables—viewed from the user's position. When one of the worktables is rotated, the screen resting against this table is pivoted by a relatively small angle towards the other worktable, the maximum movement in the direction of the other table being effected by the projecting corner of the rectangular workpiece holder. Upon completion of the rotation, the screen returns to its initial position in which it rests against a longitudinal or narrow side of the workpiece holder and in which it is again out of the path of movement of the workpiece holder associated with the other screen. The screens just described only provide a separation between the two worktables. To screen the processing area from the outside, additional screens extending about the corner of the worktables are required so that the known arrangement offers altogether a very complex design and requires quite a number of movements to permit the workpieces to be mounted and processed by alternation.

Another prior art machine tool is designed as a so-called longitudinal worktable machine tool. Such machine tools or machining centers are provided with a very long worktable having a longitudinal extension of, say, 15 feet or more. In some of these prior art machine tools, the work table is fixed and the spindle stock can be displaced along an axis, parallel to the longitudinal axis of the work table by means of a sliding carriage, carrying the spindle stock. The spindle stock, itself, can further be displaced along further coordinate directions or rotated about vertical or horizontal axes. However, there are also other known machine tools of this kind where the worktable itself can be displaced along its longitudinal axis and the spindle stock is fixed with respect to that axis but can be displaced along further coordinate directions, perpendicular to the longitudinal axis of the worktable and/or can be rotated about such further axes. Further, machine tools are known where both the spindle stock and the worktable are displaceable along directions parallel to the longitudinal axis of the worktable.

The user of such a longitudinal worktable machine tool normally stands next to a longitudinal side of the worktable and the spindle stock is arranged on the opposite longitudinal side. Therefore, the longitudinal worktable is subdivided into a processing side and a mounting side on the right-hand side and on the left-hand side, respectively, of the worktable.

In one prior art machine of this kind, the machine tool is entirely surrounded by a cabin having a rectangular shape, viewed from above, with two long sides parallel to the longitudinal sides of the worktable. The front side of the cabin is provided with sliding doors giving access to the worktable almost over its entire length. The sliding doors are arranged such that e.g. the right half of the longitudinal side may be closed whereas the left-hand side may remain open to allow loading or unloading of workpieces on the mounting side of the worktable. However, in such a case, the user of the machine tool bending over the worktable can be subjected to drilling coolant, splashing around, or can even be injured by metal chips flying around, because there is no separation between the working side and the mounting side of the worktable.

It is, therefore, a first object of the present invention to improve a machine tool of the type described above in such a manner that the worktable is freely accessible from the mounting side, while simultaneously an efficient splash guard is provided between the processing side and the mounting side to protect the user.

It is a further object of the invention to provide a working space above the processing area that is larger than that above the mounting area in order to be able to displace the spindle stock relative to the worktable with the tool travelling over the worktable surface from one end of the surface processing side to the other end near the splash guard.

It is, still, another object of the invention to provide for a machine tool of the abovementioned kind in which the total surface of the worktable can be used and only very few mechanical elements are provided for pivoting the splash wall.

According to still another object of the invention, the machine tool of the abovementioned kind shall be further developed in that a perfect sealing between the processing side and the mounting side is achieved with a minimum wear of pivotable splash guard means.

According to the invention, this object is achieved by a machine tool comprising a spindle stock; a worktable having an upper surface thereon, the worktable and the spindle stock being alternatively displaceable relative to each other in a plane parallel to the upper surface from a first position at which a first portion of the upper surface is disposed proximate the spindle stock and serves as a processing area and a second portion of the upper surface is disposed distal to the spindle stock and serves as a mounting area, to a second position at which the upper surface second portion is disposed proximate the spindle stock and serves as a processing area and the upper surface first portion is disposed distal to the spindle stock and serves as a mounting area; splash guard means for separating the processing and mounting area; and hinge means defining a first pivot axis and mounting said splash guard means to the table upper surface for enabling the splash guard to be folded about the first pivot axis relative to the upper surface in order that a first working space above the processing area remains larger than a second working space above the mounting area when either the first or second portions of the upper surface is proximate the spindle stock.

In a preferred embodiment of the invention, the worktable is disposed in a horizontal relationship and configured for rotation about a vertical axis, the splash guard means is disposed parallel to the vertical axis in a spaced apart relationship therewith and subject to parallel displacement when the rotatable table is rotated from the first to the second position.

Thus, the position of the splash guard, for example a massive splash wall, is such, independent of the respective position of the worktable, that a larger working space is available above the processing side so that the spindle stock can be moved a long way in the direction of the operator. During displacement of the table, the position of the splash guard changes automatically as the table and the spindle stock move relative to each other, so that no additional guiding means acting from above are required. Thus, the mounting side remains freely accessible from above and can be approached without any difficulty, for example by a crane carrying a heavy or bulky workpiece. The splash guard, for example the massive splash wall, which always assumes correct position, ensures automatically and without the need for any additional intervention that the user of the machine is protected reliably against splashing drilling coolant or metal chips flying around.

The invention, therefore, not only opens up extended applications for the machine tool, for example for heavier and bulky workpieces, but improves in addition the safety for the user.

According to a further embodiment of the invention, said splash wall is held on an upper section thereof by means of a holding element grasping the upper section from both lateral sides by means of fork-like extensions, the holding element being located at a radial distance from a vertical second pivot axis of the worktable and above the mounting side, the extensions being rotatable about a vertical third pivot axis arranged parallel to the second pivot axis at the radial distance.

These measures are particularly useful for such machine tools having a worktable rotatable about a vertical axis. In that case, only one fixed holding element is required that must be rotatable about a vertical axis and grasp the upper section of the pivotable splash wall resulting in the surprising effect that the splash wall is automatically folded between its two folding end positions without any separate gearing or pivotable bars. In contrast, the splash wall is simply pivoted entirely automatically under the action of the pivoting worktable.

According to another embodiment of the invention, the splash wall is held on an upper section thereof by means of a holding element grasping the upper section from lateral sides by means of fork-like extensions, the holding element and the worktable being arranged displaceable relative to each other in a direction essentially perpendicular to the first pivot axis.

These measures are distinctly advantageous in the following two cases:

In a first case, the worktable is made as a fixed long table having two sides for workpieces arranged one next to the other along their longitudinal direction of the worktable. The machine tool spindle can be displaced between these two sides in a direction parallel to the longitudinal axis of the worktable. In that case, the splash wall will be folded by means of the holding element which is displaceable along the longitudinal axis of the worktable, too.

In the second case, the long worktable itself is made displaceable along its longitudinal axis whereas the holding element is made fixed in space. In both cases, a larger working space is established on the right-hand side or on the left-hand side of the worktable, serving as a larger processing side whereas the other side is a smaller mounting side and the positions of the sides are cyclically interchanged between each other.

In a preferred variation of this embodiment, the holding element is arranged on a lower side of a fixed further splash wall, tapering over the mounting area or being arranged vertically.

These measures have the advantage that only the lower section of the entire splash guard means needs to be pivoted, thus reducing the mechanical elements although the splash guard, separating the processing area from the mounting area, may extend vertically or tapered high enough to ensure protection of the operating people.

In a further variation of the embodiment, the holding element is made as a rotatable fork.

These measures have the advantage that the upper section of the splash wall may be guided precisely, because the rotatable fork may be made from metal or from a hard plastic material which are not subjected to substantial wear. Further, the height of the prongs of the fork may be dimensioned such that the upper section of the splash wall may just touch the ground of the fork in a vertical position of the splash wall whereas in a lower end position in which the splash wall assumes its mostly inclined position, the upper section may just still be held from free ends of the prongs. If the inclination angle of the splash wall is not too large, it can be possible that the prongs of the fork need not to be guided through respective windows in the splash wall.

However, according to another alternative embodiment of the invention, the holding element is made as an elastic lip, extending parallel to an upper edge of the splash wall and having a central gap, the lip overlapping the upper edge on opposite sides with two flaps, extending on both sides of the gap.

These measures have the particular advantage that no rotary bearing must be provided for the holding element, because the elastic halves of the lip may sufficiently be deflected elastically in that area where the upper section of the splash wall is guided in the gap, if the worktable is made rotatable about a vertical axis. The width of the gap need not to be larger than the thickness of the splash wall.

According to a further preferred variation of this embodiment, the upper section is provided with a central elevation.

This has the advantage that the fork-like extensions can be made very short, because in the folded end positions of the splash wall in which the upper section will lower most between the prongs, the elevated center of the splash wall will be grasped by the fork-like extensions whereas in the middle extreme position in which the splash wall stands vertically, the fork-like extensions need only to grasp the lower unelevated lateral sides of the upper section.

According to another embodiment of the invention, the aforementioned objects are solved by a machine tool comprising a spindle stock, a rotatable worktable having an upper surface thereon, the rotatable worktable being alternatively rotatable about an axis perpendicular to the upper surface from a first position at which a first portion of the upper surface is disposed proximate the spindle stock and serves as a processing area and a second portion of the upper surface is disposed distal to the spindle stock and serves as a mounting area, to a second position at which the upper surface second portion is disposed proximate the spindle stock and serves as a processing area and the upper surface first portion is disposed distal to the spindle stock and serves as a mounting area, further comprising splash guard means for separating the processing and mounting areas, the splash guard means comprising a rigid splash wall mounted on the upper surface perpendicularly thereto, a fixed portal extending over the splash wall and aligned therewith in rotary working end positions of the worktable, the portal being provided with an elastic lip having a central gap essentially coinciding with the axes and subdividing the lip into two flaps, overlapping the splash wall on opposite sides thereof.

These measures have the distinct advantage that the pivotable splash guard elements are reduced to small flaps of the elastic lips such that only minimum mechanical movements are necessary exerted on elastically deformable flaps of the lip. Therefore, even during a long-term operation of the machine tool, the splash guard elements will not be subject to wear, because they are only subjected to very small actuating forces.

Using a portal, i.e. a bridge- or beam-like element for spanning, the worktable has the advantage that the remainder parts of the splash guard system may be made from rigid walls which, additionally, can be made of a translucent material so that the operator of the machine tool may visually inspect the processing side during handling workpieces on the mounting side and a perfect sealing is established simultaneously between these two sides.

Other advantages of the invention will become apparent from the following specification and the drawing. It is understood that the features that have been described before and will be explained hereafter can be used not only in the given combination, but also in any other combinations or separately, without leaving the scope of the invention. In particular, it goes without saying that the invention is by no means restricted to machine tools with horizontal worktables that can be rotated about a vertical axis, but that it can be used with advantage also in connection with worktables which are guided in a different manner, in particular tilted or displaced about any space axis.

Certain embodiments of the invention will be described hereafter in greater detail with reference to the drawing in which:

FIG. 1 shows a top view, partially broken away, of one embodiment of a machine tool according to the invention;

FIG. 2 is a diagrammatic representation of the details of a parallelogram guide for actuating a splash wall of a machine tool according to the invention;

FIGS. 3a to 3c show diagrammatic representations of three phases of the rotary movement of a worktable effected by a parallelogram guide according to FIG. 2;

Figure 5:
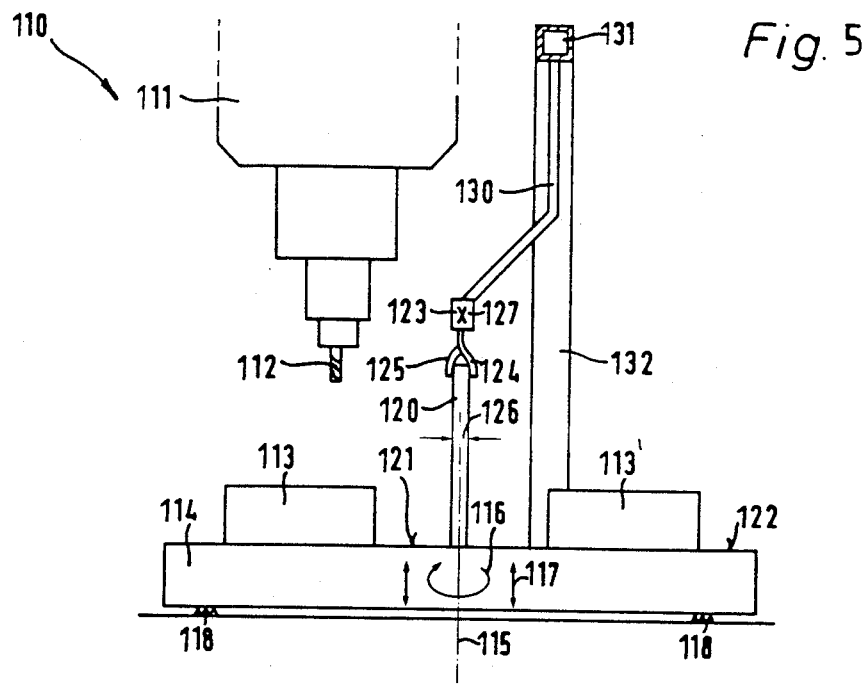
Figure 6:
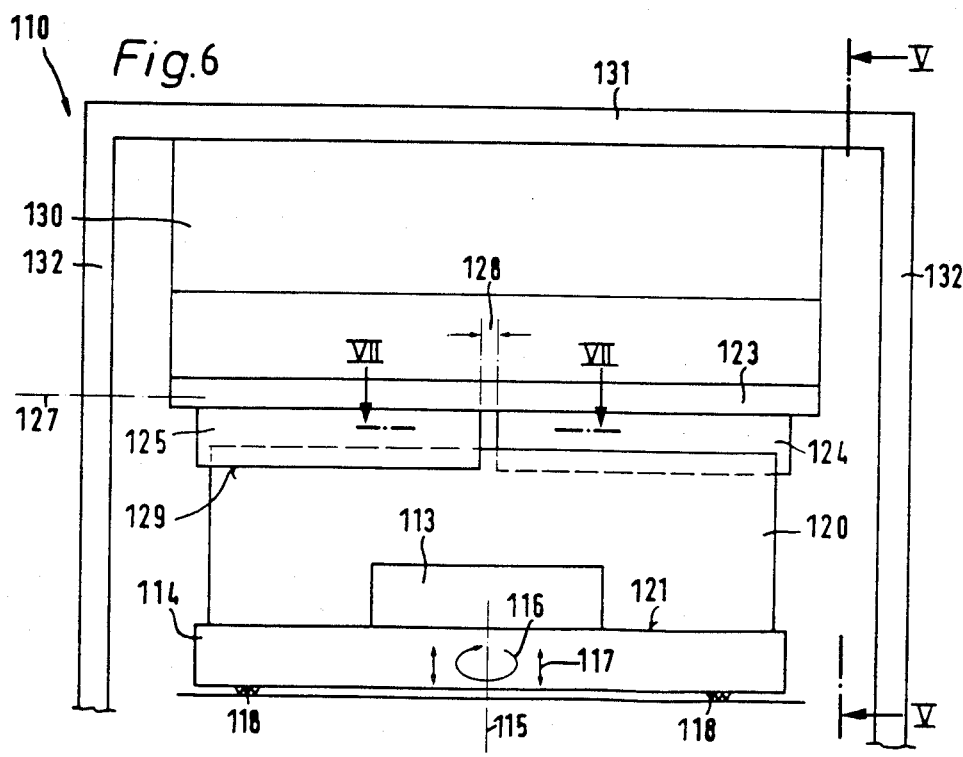
Figure 7:
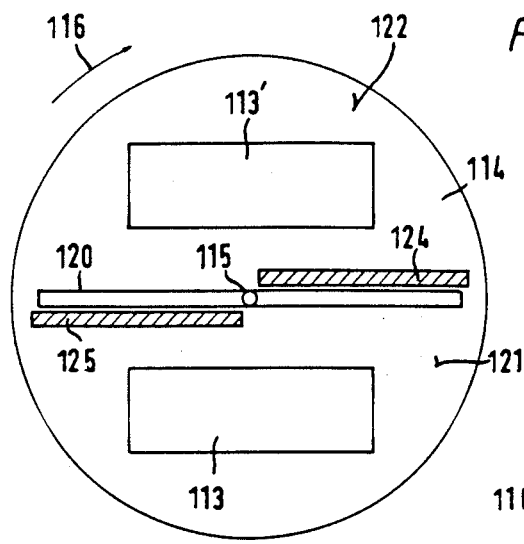
Figure 8:
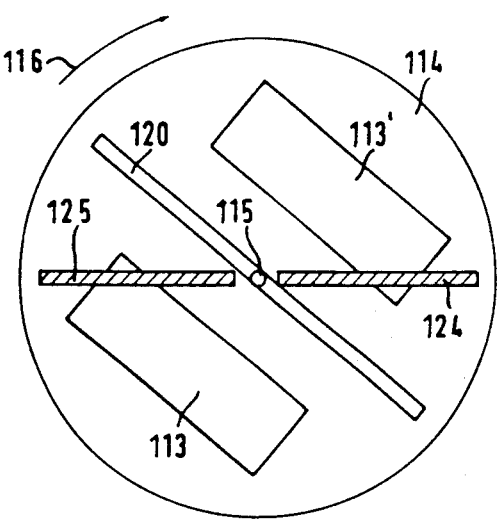
Figure 9:
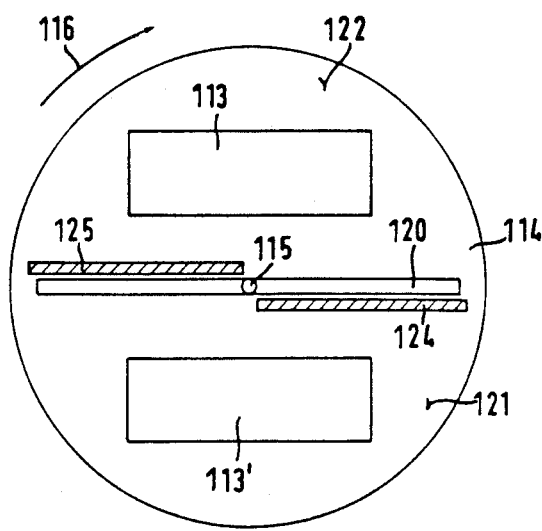

FIG. 5 a side elevational view of one portion of another embodiment of a machine tool according to the invention, seen in the direction of line V—V of FIG. 6;

FIG. 6 a front elevational view of the machine tool of FIG. 5, seen from the processing side of a worktable;

FIGS. 7 through 9 three phases for explaining the kinematics of the embodiment of FIGS. 5 and 6;

FIG. 10 a schematic side elevational view of another embodiment of a machine tool according to the invention, having a fork-shaped holding element;

FIG. 11 a representation, similar to that of FIG. 10, but for another embodiment of a machine tool according to the invention, having an elastic lip as a holding element, seen in the direction of line XI—XI of FIG. 11a;

FIG. 11a a side elevational view of a detail of the arrangement according to FIG. 11;

FIGS. 12 through 17 side elevational view and top plan views of the embodiment of FIG. 10 for six different rotational positions of the worktable;

FIGS. 18 through 20 side elevational views and top views of three different displacement positions of a worktable, being axially displaceable relative to a holding element.

In the top view of FIG. 1, part of the front portion of a machine tool is designated by reference numeral 10. A spindle stock 11, of which only the outlines are indicated by dash-dotted lines, can be displaced in the drawing plane, as indicated by a second position 11a. There can be further seen a worktable which is designated as a whole by reference numeral 12 and which can be rotated by 180 degrees about a vertical axis 13 extending perpendicularly to the drawing plane, in the directions indicated by the double arrow 14. The machine tool 10 is enclosed on all sides by a cover whose front portion facing the user is designated by reference numeral 15. The front cover 15 is provided with an opening 16 so that the user can take a position at a point 17 in front of the machine tool 10 or a bulky or heavy tool can be transported into the interior space of the cover from the front and onto the worktable 12 by means of a crane.

The surface of the worktable 12 is subdivided into a processing side 19 in the area of the spindle stock 11 and a mounting side 20 near the opening 16, with a central portion 21 being arranged between these two portions. On the processing side 19, a mounted workpiece 22 can be seen, while another workpiece 22a can be mounted by the user in the mounting side 20 within the outline shown in dashed lines, for the next processing operation. It can be seen that the workpieces 22, 22a do not project beyond the surfaces of the processing side 19 and the mounting side 20, respectively.

The spindle stock 11 projects a certain distance beyond the spindle 23 extending along the spindle axis 24, because the spindle stock 11 is enclosed by a casing 25 housing the drive elements, the gripper arms for changing the tools, a tool magazine, and the like. It is, therefore, understood that during machining of the workpiece 22 a certain clear space must be reserved on the processing side 19 relative to the mounting side 20 so that the spindle stock 11 can be advanced far enough to permit the spindle axis 24 to move over the whole surface of the workpiece 22. This clear space is provided by the central portion 21 which is clear of the workpieces 22, 22a.

In order to protect a user who, standing in front of the machine at the point 17, mounts a workpiece 22a while the workpiece 22 is being machined, from splashing drilling coolant and metal chips flying around, a splash wall 28 is arranged between the mounting side 22 and the central portion 21. This particular location of the splash wall 28 permits the spindle stock 11, with its casing 25, to be moved right up to the splash wall 28, as indicated by reference numeral 11a, and the spindle axis 24 can accordingly move over the whole surface of the processing side 19.

However, it is also obvious that the splash wall 28 cannot be mounted rigidly in the position shown in FIG. 1, because it would in this case, after rotation of the worktable 12, by 180 degrees, assume a position 29 in which it would obstruct the processing of the workpiece 22a which would then be located on the processing side 19.

The splash wall 28 is, therefore, moveable in the manner that will be described hereafter with reference to FIG. 2.

It can be seen that the splash wall 28 forms one longitudinal side of a parallelogram guide. A first lever 30 carrying on its free end the splash wall 28 via a joint 31 is arranged to pivot about the vertical axis 13. A second lever 33 which likewise carries on its free end the splash wall 28 via a joint 34 is mounted to pivot about another axis 33 arranged at a certain spacing from the vertical axis 13. A bar 35 interconnecting the levers 30, 33 by means of joints 36, 37 ensures that the tool levers 30, 33 are moved in synchronism. The levers 30, 33, therefore, take the form of two-armed levers, with a first lever arm 41 carrying the splash wall 28 and a second lever arm 42 guiding the bar 35.

It results that the parallelogram guide is formed on the one hand by the surface of the table 12, with the first pair of joints 13, 32, the two levers 30, 33 and, finally, the splash wall 28 with the two joints 31, 34. Strictly speaking, the bar 35 could also be dispensed with; it serves essentially as a means to avoid that the forces necessary for moving the parallelogram guide have to be transmitted by the splash wall 28.

For operation of the parallelogram guide, a third lever 38 forming an actuating lever and carrying on its free end a roller 39 is fixed rigidly on the second lever 33. In the position shown in FIG. 2, the roller 39 rests against a first fixed stop 40. Another fixed stop 40a is arranged symmetrically opposite the first stop 40, relative to the axes 13, 32.

The third lever 38 is provided near its axis of rotation 32 with another joint 43 which is engaged by one end of a tension spring 44. The other end of the tension spring 44 is fastened to a point 45 provided on a projection 46 of the worktable 12. The joint 45 and the axes 32 and 13 are all provided on one straight line 47.

The operation of the parallelogram guide shown in FIG. 2 will now be described with reference to the different phases of movement shown in FIGS. 3a to 3c:

For greater clarity, one of these areas of the worktable 12 is designated by A, the other one by B in the representations shown in FIGS. 3a to 3c. In the initial position shown in FIG. 3a, the zone of the area A which is shaded by dashed lines is positioned on the mounting side, while the area B is positioned on the processing side. The parallelogram guide with its element 30 to 42 occupies its final end position shown already in FIG. 2. Identical parts are designated by identical reference numerals in FIGS. 2 and 3a to 3c.

Now, when the worktable 12 is rotated into the position 12a shown in FIG. 3, in the direction indicated by arrow 50, the roller 39 is disengaged from the first fixed stop 40. The parallelogram guide is moved into a zero position, under the action of the tension spring 44, in which the roller 39, the joints 45, 43, 32, 34, 13 and 31 and the splash wall 28 as well are all arranged along one straight line 47.

Figure 4A:
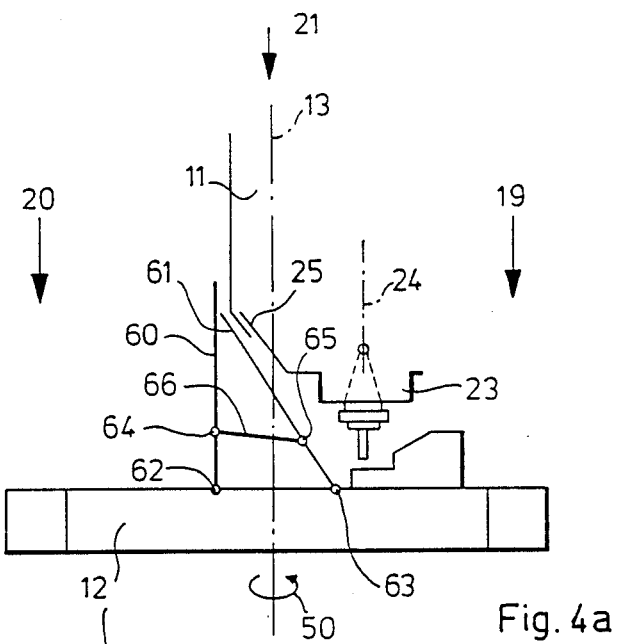
FIGS. 4a and 4b show diagrammatic lateral and top views of a detail of another embodiment of the machine tool according to the invention.
Figure 4B:
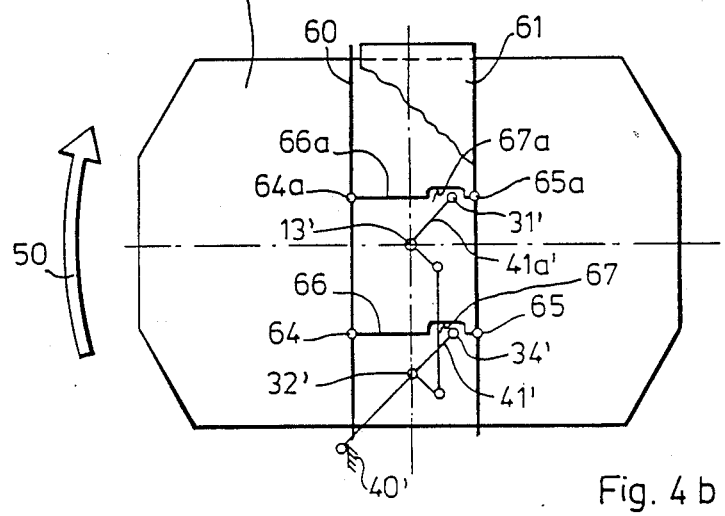

When the worktable 12 is rotated further from the position 12a shown in FIG. 3b in the direction indicated by arrow 50 into the end position 12b of FIG. 3c opposite to that shown in FIG. 3a, the roller 39 runs up against the second fixed stop 40a, shortly before this end position 12a is reached, and the parallelogram guide with its elements 30 to 42 is opened again, against the action of the tension spring 44, to occupy a position symmetrical to that shown in FIG. 3a. This brings the splash wall 28 into a position at a certain distance from the center of the mounting side 22, but now the areas A and B have changed their locations. FIG. 4a and 4b show lateral and top views of another embodiment of the invention.

In the lateral view of FIG. 4a, one can see the worktable 12—which as such is unchanged—comprising the processing side 19 with the spindle stock 11 and the mounting side 20. However, contrary to the embodiments shown in FIGS. 1 to 3, the embodiment shown in FIG. 4 does not comprise one, but rather two splash walls which are designated by reference numerals 60 and 61. The first splash wall 60 is arranged perpendicularly relative to the surface of the worktable 12 in a position corresponding to the position of the splash wall 28 in FIG. 1. The second splash wall 61 is arranged symmetrically to the first splash wall 60, relative to the perpendicular axis 13. It is, however, inclined way of the processing side 19 and may, for example, touch the first vertical splash wall 60 by its upper free edge.

As can be clearly seen in FIG. 4a, the inclined arrangement of the second splash wall 61 does not lead to a substantial loss in working space in the area of the processing side 19, because the casing 25 of the spindle stock 11 is anyway tapered downwardly in the direction of the spindle axis 24 so that the spindle axis 24 can be advanced right to the periphery of the area on the processing side 19. On the other hand, however, the second inclined splash wall 62 is excellently suited to guide the splashing drilling coolant or metal chips off to the bottom so that they are prevented from getting into the central area 21 between the splash walls 60, 61 which accommodates the mechanism ensuring the oppositely directed movement of the splash walls 60, 61.

In order to effect this oppositely directed movement, the splash walls 60, 61 are pivoted on the surface of the worktable 12 in hinges 62, 63. Joints 64, 65 connected with one bar 66 or several parallel bars 66, 66a, are provided on the splash walls 60, 61 at equal distances from the hinges 62, 63. From this it appears that the bars 66 and the joints 64, 65, the lower sections of the splash wall 60, 61, the hinges 62, 63 and the surface of the worktable 12 in the area of its central portion 21 form together a trapezoidal four-bar linkage. This four-bar linkage can be moved into the position shown in FIG. 4a and to a position mirror-symmetrical thereto, relative to the vertical axis 13, in which position the said first splash wall 60 occupies an inclined, and said second splash wall 61 occupies a vertical position.

In order to effect this reciprocating movement in synchronism with the reciprocating rotation of the worktable 12 by 180 degrees, there is provided a parallelogram guide shown in FIG. 4b which largely corresponds to that shown in FIGS. 2 and 3. In FIG. 4b, the same reference numerals have been used for equivalent elements of the parallelogram guide as in FIGS. 2 and 3, if necessary supplemented only by an apostrophe.

In FIG. 4b it can be clearly seen that the three ends of the lever arms 41' do not carry the splash wall directly, as in the case of the embodiment illustrated in FIGS. 2 and 3; rather the free ends engage oblong holes 67 and 67a of two mutually spaced bars 66 and 66a which connect the splash walls 60 and 61 in the manner illustrated in FIG. 4a. When the worktable 12 is rotated in one direction, the parallelogram guide is initially moved into the zero position under the action of a tension spring which, for clarity's sake, is not shown in FIG. 4b, in which the splash walls 60, 61 form an equal triangle together with the base defined by the central portion 21, as shown in FIG. 4a. Shortly before the second end position is reached at the end of the rotary angle of a 180 degrees, the parallelogram guide opens again symmetrically in a direction opposite to the original direction, and the splash walls 60, 61 assume a position symmetrically opposite to that shown in FIG. 4a.

In FIG. 5, 110 indicates another embodiment of a machine tool according to the invention having a vertical axis spindle stock 111, with a spindle into which a tool 112 is inserted. Workpieces 113, 113' are mounted on a worktable 114 which may be pivoted about a vertical axis 115 in the direction of an arrow 116 by 180 degrees in one direction and in the opposite direction.

Another arrow 117 indicates that worktable 114 may exert a small vertical movement of, say, 2 inches such that worktable 114 during pivoting may be lifted from form-locking recesses, e.g. a Hirth-type serration indicated with 118 to be then lowered again after having been pivoted by 180 degrees into these recesses in the direction of arrow 117.

Worktable 114 is rigidly coupled with a splash wall 120 extending along a diameter of worktable 114 and extending vertically upwards. Splash wall 120 may be preferably made of acrylic plastic material, i.e. a translucent material. Splash wall 120 subdivides the surface of worktable 114 into a processing side 121 being in the working area of spindle stock 111 and a mounting side 122 on the opposite side.

Above worktable 114, a beam 123, preferably intersecting vertical axis 115, is arranged. A first splash guard element 124 is attached to the underside of beam 123 and a second splash guard element 125 is arranged symmetrically to vertical axis 115. Splash guard elements 124, 125 may be made as elastic flaps from a translucent plastic material and being several inches high, e.g. two or four inches high. However, they can also be made as rigid sheet material, as rigid acrylic glass plates or the like, being attached to the underside of beam 123 by means of hinges. In the position shown in FIGS. 5 and 6, first splash guard element 124 overlaps splash wall 120 on mounting side 122 whereas second splash guard element 125 overlaps splash wall 120 on processing side 121. Splash guard elements 124, 125 are, therefore, pivoted against each other by a pivotal path that corresponds to a thickness 126 of splash wall 120. A horizontal axis is indicated by reference numeral 127 and splash guard elements 124, 125 are pivotable about horizontal axis 127.

Splash guard elements 124, 125 are preferably distant from each other at the location of vertical axis 115 by a width 128 that corresponds to the thickness 126 of splash wall 120.

Splash guard elements 124, 125 extend from beam 124 downwardly such that their lower edge 129 is always situated above workpieces 113.

Above beam 123, a further splash wall 130 is arranged, which can also consist from acrylic glass. Further splash wall 130 extends from beam 121 upwardly in an inclined direction and is directed towards mounting side 122 for ending at its upper side in a portal 131, spanning worktable 114 and being supported on both sides by supports 132. Due to this design of further splash wall 130, spindle stock 111 may be displaced to the right-hand side, as can be seen from FIG. 5, without contacting with its upper, laterally extending portion further splash wall 130. Thus, tool 112 may be displaced until the direct vicinity of splash wall 120.

The operation of the arrangement, described before, shall now be explained with respect to the top elevational views of FIGS. 7 through 9.

FIG. 7 again shows worktable 114 in a top elevational view in its end position, as already depicted in FIGS. 5 and 6 in a side elevational view. In this one end position, workpiece 113 is situated on processing side 121 whereas workpiece 113' is situated on mounting side 122. First splash guard element 124 overlaps splash wall 120 on mounting side 122 whereas second splash guard element 125 overlaps splash wall 120 on processing side 121.

If worktable 114 is now pivoted in the direction of arrow 116, splash wall 120 with its portion near vertical axis 115 will be pivoted within the gap between splash guard elements 124 and 125. The latter will first be pivoted back into a vertical position under the influence of gravity such that they are flush with a diameter of worktable 114, as can clearly be seen from FIG. 8. During pivoting of worktable 114, workpieces 113, 113' will be displaced below splash guard elements 124, 125 without touching the latter, because lower edge 129 is arranged above workpieces 113, 113', as explained previously.

When the opposite end position of worktable 114 is reached, as shown in FIG. 9, workpiece 113' will now be situated on processing side 121 whereas workpiece 113 will be located on mounting side 122.

First splash guard element 124 will now overlap splash wall 120 on processing side 122 whereas second splash guard element 125 overlaps splash wall 120 on mounting side 122.

Seen as a whole, splash guard elements 124, 125 have only made minimum pivotal movements, corresponding to thickness 125 of splash wall 120. As the gap between splash guard elements 124, 125 has a width 128, corresponding to thickness 126 of splash wall 120, no force was exerted on the inner rims of splash guard elements 124, 125 from splash wall 120 during pivoting of worktable 114.

The machine tool shown in FIGS. 5 through 9 is a preferred embodiment of the invention in which splash guard elements 124, 125 only exert a sealing function between splash walls 20 and 30, splash guard elements 124, 125 being vertically dimensioned with only a few inches such that only very small pivot angles occur during pivoting of worktable 114. On the other handside, worktable 114 may easily perform its vertical movement in the direction of arrow 116 during pivoting.

However, it goes without saying that further embodiments of the invention are possible in which splash guard elements 124, 125 are directly attached to portal 131. The splash guard elements for such a variation of the invention may be made as one integral curtain being only provided at its lower end with a central gap such that splash wall 120 may perform the necessary pivotal movement relative to the two lower ends on both sides of the gap.

In FIG. 10, 210 as a whole indicates a further embodiment of a machine tool according to the invention being preferably a machining center with a vertical axis spindle.

Machine tool 210 of FIG. 10 is equipped with a spindle stock 211 having a spindle into which a tool 212, e.g. a drilling tool, is inserted. A spindle axis 213 extends vertically. 214 designates an outer contour or outline of spindle stock 211. As one can clearly see, contour 214 horizontally extends beyond spindle axis 213 such that contour 214 has to be taken into account when tool 212 is displaced.

A worktable 220 may be pivoted about a vertical axis 221 in the direction of an arrow 222 by, preferably, 180 degrees in opposite directions.

The surface of worktable 220 on its side opposite spindle stock 211 is defined as a mounting side 223 whereas the opposite side is defined as a processing side 224. An unmachined workpiece 225 may be mounted on mounting side 223 by a user 227 while simultaneously another workpiece 226 may be machined on the processing side 224 by means of tool 212. By cyclically pivoting worktable 220 by 180 degrees each about pivot axis 221, user 227 may unload machined workpieces from mounting side 223 and load unmachined raw workpieces while, simultaneously, totally or partially unmachined workpieces are processed on processing side 224.

In order to protect user 227 from drilling coolant and metal chips which fly around on processing side 224 during machining of workpieces 226, a splash wall, designated integrally with 230 is provided between processing side 224 and mounting side 223.

Splash wall 230 is provided with an upper fixed section 231 which is inclined or tapering towards user 227. A lower pivotable section 232 of splash wall 230 may be pivoted by its lower side about a pivot axis 233, as indicated by an arrow 234. From the side elevational view of FIG. 10, one can clearly take that in this way an essentially larger working space 235 is established above processing side 224 as compared to that above mounting side 223. Because of this, it is possible that spindle stock 211 with tool 212 be displaced into the area of vertical pivot axis 221 without outer contour 214 of spindle stock 211 colliding with splash wall 230. On the other handside, the smaller working space 236 above mounting side 223 is sufficiently large, because user 227 will normally load or unload workpieces 225 from the lateral side or, maybe, from an inclined position above mounting side 223.

In order to ensure that the above described conditions remain unchanged when worktable 220 is pivoted about vertical axis 221 by 180 degrees, the following is done:

At the lower side of fixed section 231 of splash wall 230, a bearing 240 is arranged, e.g. as a longitudinal beam, extending perpendicularly to the plane of FIG. 1. The lower side of bearing 240 is rotatable but fixed in a vertical direction by means of a pivot pin 241 which, in turn, carries a fork 242 at its lower end. Fork 242, therefore, may be pivoted about an axis 249 that extends parallel to vertical pivot axis 221 of worktable 220 but distant by a distance d therefrom. Distance d may e.g. be equivalent to one half or one third of the depth of mounting side 223 of worktable 220.

Fork 242 is provided with two prongs 243, 244, directed downwardly which, also, may be rotated about axis 249 in the direction of arrows 245. Prongs 243, 244 enclose a profiled bar 246, e.g. a cylindrical bar which forms an upper side of pivotable section 232 of splash wall 230. Profiled bar 246 only serves as a mechanical reinforcement and must not be provided in any case.

Pivotable section 233 may be provided with a window 247 in the area below prongs 243, 244. Window 247 is necessary when prongs 243, 244 are long as can be seen from left prong 243 in FIG. 10, penetrating window 247.

As will be explained in further detail with respect to FIGS. 12 through 20, profiled bar 246 will exert a vertical movement between prongs 243, 244, as indicated by an arrow 248, when worktable 220 is pivoted.

FIGS. 11 and 11a show an alternative embodiment in which instead of a fork 242 with prongs 243, 244 an elastic lip 250 is used.

Elastic lip 250 extends along an upper side of pivotable section 233 of splash wall 230. Elastic lip 50 is provided with a central gap 253, the width of which is essentially equal to the thickness of the upper side of the pivotable section 233 or the profiled bar 246, respectively. Halves 251, 252 of elastic lip 250, arranged on both sides of gap 253, overlap the upper side of pivotable section 233 or, in the described embodiment they overlap profiled bar 246, on opposite sides as can clearly be seen from FIG. 11a.

In both cases, therefore, the result is that the upper side of pivotable section 232 is grasped from both sides wherein the protrusions used, i.e. prongs 243, 244 of fork 242 or halves 251, 252 of elastic lip 250, respectively, are pivotable by a certain amount about axis 249 which is possible in the case of prongs 243, 244 because of rotatable pivot pin 241 and is further possible due to the elasticity of lip 250 in the case of halves 251, 252.

The operation of the machine tool according to FIGS. 10 and 11 will become apparent from FIGS. 12 through 21 where for the sake of clarity FIGS. 11 through 21 illustrate the operation with respect to an embodiment similar to that of FIG. 10.

Figure 12:
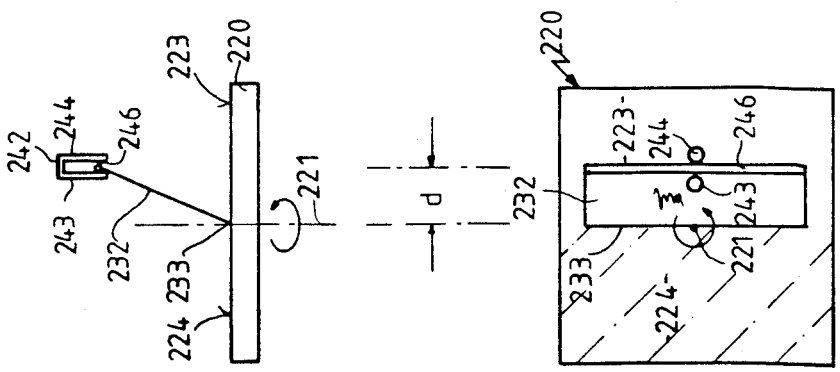

The upper half of FIG. 12 shows an extremely simplified side elevational view of the situation of FIG. 10 and the lower half of FIG. 12 shows the respective top elevational view.

Figure 13:
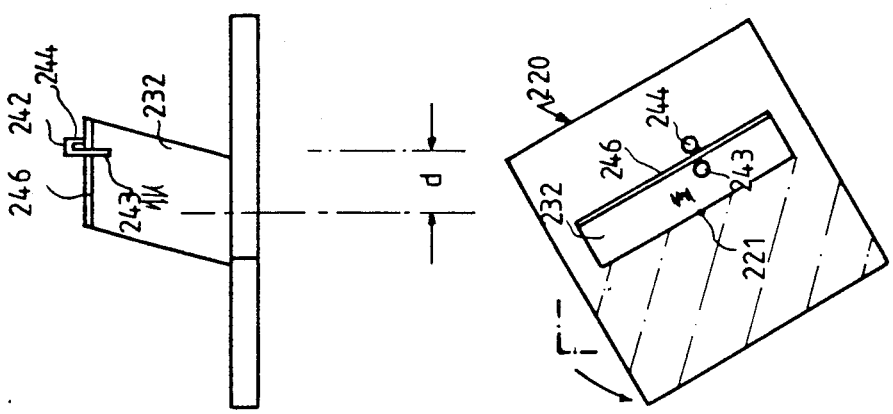

As one can clearly see from FIG. 12, prongs 243 and 244 have grasped profiled bar 246 from both sides. If now worktable 220 is pivoted by, say, 30 degrees in a counter-clockwise direction, a situation is created as shown in FIG. 13 in which processing side 224, indicated in dash-dotted lines, has already been pivoted downwardly in the top plan view. Prongs 243, 244 have been displaced axially outwardly on profiled bar 246, as compared with the FIG. 12 position, because the position of pivotable section 232 was altered whereas fork 242 had been kept fixed above worktable 220 and distance d is, hence, constant. Because of prongs 243, 244, grasping both sides of profiled bar 246, fork 242 had to rotate by 30 degrees, too, as compared with the FIG. 12 position.

Figure 14:
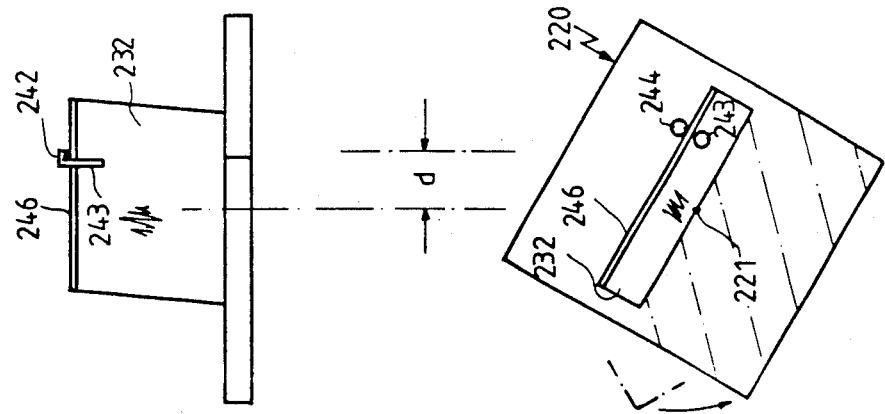

FIG. 14 shows a further position of worktable 220 after having been further rotated by another 30 degrees in a counter-clockwise direction. One can see that prongs 243, 244 have even further been displaced axially and outwardly on profiled bar 246, and one can see from the side elevational view that profiled bar 246 has been further moved upwardly and now approaches the bottom of fork 242.

FIG. 15 shows an intermediate extreme position in which worktable 220 has been pivoted by a total of 90 degrees in a counter-clockwise direction as compared with the initial position of FIG. 12. Pivotable section 232 of splash wall 230 now extends vertically from the surface of worktable 220 such that profiled bar 246 has now reached the bottom of fork 242. Prongs 243, 244 of fork 242 are now in their extreme axial position which corresponds to distance d from the center of profiled bar 246.

FIG. 16 shows a further rotation by 45 degrees and prongs 243, 244 have again been displaced back to the center of profiled bar 246 while profiled bar 246 itself has been lowered again within fork 242.

In FIG. 17, finally, the second working position of worktable 220 has been reached in which the area, indicated in dash-dotted lines that had been situated on the processing side 224 in FIG. 12, does now occupy mounting side 223.

One can take from the preceding description that the length of prongs 243, 244 or halfs 251, 252 of elastic lip 250, respectively, must be dimensioned such that in the flattest end position of pivotable section 232 of splash wall 230, as shown in FIGS. 12 and 17, profiled bar 246 may not slip downwardly out of the holding element, established by either fork 242 or elastic lip 250. On the other handside, the dimensioning must be made such that in the erect position of pivotable section 232 according to FIG. 15, profiled bar 246 may not yet collide with the bottom of fork 242 or gap 243, respectively.

In the upper half of FIG. 15 it is, further, indicated that profiled bar 246 may be designed a little bit higher in its center, as shown in dash-dotted line and as indicated by reference numeral 246'. This elevation of profiled bar 246' in its central part makes it possible to design prongs 243, 244 somewhat shorter such that even if splash wall 232 is designed to extend flatter, no window has to be provided in splash wall 232, as had been indicated by reference numeral 247 in FIG. 10. The elevation of profiled bar 246' in its center effects that the central peak of the elevation in the down-folded end sections of splash wall 232 is still safely grasped by prongs 243, 244 whereas the flatter lateral sections may reach until the bottom of fork 242 in the extreme middle position shown in FIG. 15. When elevation 246' is dimensioned optimally, elevation 246' will continuously glide over the bottom of fork 242 such that prongs 243, 244 need only to be a few millimeters long.

If worktable 220 is to be made rotatable by 360 degrees, central elevation 246' must be made symmetrical to the central axis, as indicated in FIG. 15. If, however, worktable 220 is preferably made rotatable only by 180 degrees in two opposite directions, it is sufficient to provide elevation 246' only on e.g. the right-hand side of the central axis, as viewed in FIG. 15.

If the inclination angle of pivotable section 232 in the end positions of FIGS. 12 and 17 is not too much different from 90 degrees, it can be made possible that the lower ends of prongs 243, 244 always run on the surface of pivotable section 232. If, however, flatter inclination angles have to be set, as indicated in FIGS. 10 and 11, it may become necessary to provide a window 247 in pivotable section 232, as indicated in FIG. 10, such that the lower ends of prongs 243, 244 may penetrate through window 247 in the extreme positions of FIGS. 12 and 17. The width of window 247 along profiled bar 246 must then be made equal to distance d in both directions of the axis 249, when worktable 220 is to be rotated by 360 degrees or equal to one half of distance d when worktable 220 is only to be rotated by 180 degrees in opposite directions.

Considering now a further variation of an embodiment of the machine tool according to the invention, as is shown in FIGS. 18 through 20, the main distinctions as compared with the embodiments, described previously, are as follows:

A worktable 220a in the embodiment of FIGS. 18 through 20 is not made rotatable about a vertical axis but rather axially displaceable in a horizontal plane, as indicated by an arrow 260, or it may be made fixed in space. In both cases, particularly in the case of a fixed worktable 220a, fork 242a is displaceable in a horizontal direction, namely in the direction of an arrow 261, the direction being essentially parallel to the longitudinal axis of worktable 220a in the direction of arrow 260. In these cases, it is only essential that worktable 220a and fork 242a are relatively displaceable with respect to each other in this direction.

In both cases, fork 242a need not to be rotatable about a vertical axis, because prongs 243a, 244a do not alter their rotary position relative to profiled bar 246a.

As one can clearly see from the two phases depicted in FIGS. 19 and 20, the pivotable section 232a of the splash wall is first pivoted into a vertical direction as shown in FIG. 19 and, then, into a position symmetrical to that of FIG. 18, as shown in FIG. 20.

The arrangement of FIGS. 18 through 20 can be used in case that a spindle stock is displaceable relative to worktable 220a in the direction of an arrow 260 by means of an appropriate guide which extends above worktable 220a in the lower half of FIGS. 18 through 20 and which extends behind worktable 220a in the upper half of FIGS. 18 through 20.

The spindle stock may machine a workpiece on processing side 224a, indicated in dash-dotted lines in FIGS. 18 through 20. The contour of the spindle stock, extending laterally, does not present a problem in this case, because pivotable section 232a was folded away from processing side 224a. As soon as the machining of the workpiece is terminated, the spindle stock will be displaced upwardly in the lower halfs of FIGS. 18 through 20 or in a rearward direction in the lower halfs of FIGS. 18 through 20 such that it may be displaced from above or behind the splash wall, respectively, into a position on the right-hand side of the splash wall. The splash wall will now be folded by means of the mechanism, described before, into the opposite end position shown in FIG. 20 and the spindle stock may again be advanced over the worktable until it has come into a position above the right half of worktable 220a in FIG. 20 where the mounting side 223a had been previously in the phase of FIG. 18. Because of the pivotable section 232a having been folded to the left-hand side, the spindle stock may now operate above the right half of worktable 220a without any risk of collision.

The embodiment of FIGS. 18 through 20 may also be provided with a fixed further splash wall arranged above the pivotable section 232a of the splash wall, as described above with respect to the embodiments of FIGS. 10 and 11. However, the additional splash wall in this case should be made exactly vertical and not tapered.

We claim:

1. A machine tool comprising:
    a spindle stock;
    a worktable having an upper surface thereon, said worktable and said spindle stock being alternatively displaceable relative to each other in a plane parallel to said upper surface from a first position at which a first portion of said upper surface is disposed proximate said spindle stock and serves as a processing area and a second portion of said upper surface is disposed distal to said spindle stock and serves as a mounting area, to a second position at which said upper surface second portion is disposed proximate said spindle stock and serves as a processing area and said upper surface first portion is disposed distal to said spindle stock and serves as a mounting area;
    splash guard means for separating said processing and mounting areas, said splash held on an upper section thereof by means of a holding element grasping said upper section from lateral sides by means of fork-like extensions, said holding element being located at a radial distance from a vertical second pivot axis of said worktable and above said mounting side, said extensions being rotatable about a vertical third pivot axis arranged parallel to said second pivot axis at said radial distance; and
    hinge means defining a first pivot axis and mounting said splash guard means to said table upper surface for enabling said splash guard to be folded about said first pivot axis relative to said upper surface in order that a first working space above said processing area remains larger than a second working space above said mounting area when either said first or said second portion of said upper surface is proximate said spindle stock.

2. The machine tool according to claim 1 wherein said holding element is arranged on a lower side of a fixed further splash wall, tapering over said mounting area.

3. The machine tool according to claim 1 wherein said holding element is made as a rotatable fork.

4. The machine tool according to claim 1 wherein said holding element is made as an elastic lip, extending parallel to an upper edge of said splash wall and having a central gap, said lip overlapping said upper edge on opposite sides with two flaps, extending on both sides of said gap.

5. The machine tool according to claim 1 wherein said upper section is provided with a central elevation.

6. A machine tool comprising:
   a spindle stock;
   a worktable having an upper surface thereon, said worktable and said spindle stock being alternatively displaceable relative to each other in a plane parallel to said upper surface from a first position at which a first portion of said upper surface is disposed proximate said spindle stock and serves as a processing area and a second portion of said upper surface is disposed distal to said spindle stock and serves as a mounting area, to a second position at which said upper surface second portion is disposed proximate said spindle stock and serves as a processing area and said upper surface first portion is disposed distal to said spindle stock and serves as a mounting area;
   splash guard means for separating said processing and mounting areas, said splash guard means being held on an upper section thereof by means of a holding element grasping said upper section from both lateral sides by means of fork-like extensions, said holding element and said worktable being arranged displaceable relative to each other in a direction essentially perpendicular to said first pivot axis; and
   hinge means defining a first pivot axis and mounting said splash guard means to said table upper surface for enabling said splash guard to be folded about said first pivot axis relative to said upper surface in order that a first working space above said processing area remains larger than a second working space above said mounting area when either said first or said second portion of said upper surface is proximate said spindle stock.

7. The machine tool according to claim 6 wherein said holding element is arranged on a lower side of a fixed further splash wall, extending vertically.

8. The machine tool according to claim 6 wherein said holding element is made as a rotatable fork.

9. A machine tool comprising:
   a spindle stock;
   a rotatable worktable having an upper surface thereon, said rotatable worktable being alternatively rotatable around an axis perpendicular to said upper surface from a first position at which a first portion of said upper surface is disposed proximate said spindle stock and serves as a processing area and a second portion of said upper surface is disposed distal to said spindle stock and serves as a mounting area, to a second position at which said upper surface second portion is disposed proximate said spindle stock and serves as a processing area and said upper surface first portion is disposed distal to said spindle stock and serves as a mounting area;
   splash guard means for separating said processing and mounting areas;
   said splash guard means comprising a rigid splash wall mounted on said upper surface perpendicularly thereto, a fixed portal extending over said splash wall and aligned therewith in rotary working end positions of said worktable, said portal being provided with an elastic lip having a central gap essentially coinciding with said axis and subdividing said lip into two flaps, overlapping said splash wall on opposite sides thereof.

10. The machine tool according to claim 9 wherein a further fixed splash wall is provided above said portal, said further splash wall tapering over said mounting area.

* * * * *